United States Patent
Roos

(10) Patent No.: US 10,296,733 B2
(45) Date of Patent: May 21, 2019

(54) ACCESS CODE OBFUSCATION USING SPEECH INPUT

(71) Applicant: Friday Harbor LLC, New York, NY (US)

(72) Inventor: Derrick Raymond Roos, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 93 days.

(21) Appl. No.: 14/798,343

(22) Filed: Jul. 13, 2015

(65) Prior Publication Data

US 2017/0017782 A1    Jan. 19, 2017

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/31* (2013.01); *G06F 21/36* (2013.01);
(Continued)

(58) Field of Classification Search
CPC ......... G10L 17/24; G10L 17/00; G10L 17/04; G10L 15/02; G10L 15/08; G10L 17/005; G10L 17/14; G10L 17/22; G10L 17/26; G10L 2015/025; G06F 21/32; G06F 21/31; G06F 21/36; G06F 21/316; G06F 21/35; G06F 21/40; G06F 21/602; G06F 21/72;
(Continued)

(56) References Cited

U.S. PATENT DOCUMENTS

| 2002/0035539 A1 | 3/2002 | O Connell |
| 2003/0074566 A1* | 4/2003 | Hypponen ............. G06F 21/31 713/183 |

(Continued)

FOREIGN PATENT DOCUMENTS

| EP | 1320083 A1 | 6/2003 |
| WO | WO2011124267 A1 | 10/2011 |

OTHER PUBLICATIONS

International Application No. PCT/US2015/040320, Notification of Transmittal of International Search Report and Written Opinion of the International Searching Authority, dated Sep. 29, 2015, 12 pages.

(Continued)

*Primary Examiner* — Abdelali Serrou
(74) *Attorney, Agent, or Firm* — Sheppard Mullin Richter & Hampton LLP

(57) ABSTRACT

In one aspect, a method includes receiving an identifier; obtaining a plurality of prompts using the identifier, wherein a first prompt corresponds to a first character of an access code, and a second prompt corresponds to a second character of the access code; causing the first prompt and the second prompt to be presented on a display at locations corresponding to a first alternative; causing third prompts and fourth prompts to be presented on the display at locations corresponding to a second alternative; receiving an audio signal comprising speech spoken by a user; and determining whether the audio signal comprises the user speaking the first prompt followed by the second prompt.

15 Claims, 9 Drawing Sheets

(51) Int. Cl.
   *G10L 17/24* (2013.01)
   *G06F 21/31* (2013.01)
   *G06F 21/36* (2013.01)
   *G07F 19/00* (2006.01)
   *G06Q 20/40* (2012.01)
   *G07F 7/10* (2006.01)
   *H04L 9/32* (2006.01)

(52) U.S. Cl.
   CPC ..... *G06Q 20/40145* (2013.01); *G07F 7/1033* (2013.01); *G07F 19/201* (2013.01); *G10L 17/24* (2013.01); *H04L 9/3231* (2013.01); *H04L 9/3271* (2013.01); *H04L 9/3226* (2013.01)

(58) Field of Classification Search
   CPC ....... G06F 2221/031; G06F 2221/2103; G06F 3/0482; G06F 21/60; G06F 2203/0383; G06F 3/013; G06F 3/0233; G06F 3/038; G06F 3/0488; G06F 3/04886
   See application file for complete search history.

(56) References Cited

U.S. PATENT DOCUMENTS

| | | | |
|---|---|---|---|
| 2004/0257238 A1* | 12/2004 | De Jongh | G06F 3/04886 340/5.85 |
| 2005/0251752 A1* | 11/2005 | Tan | G06F 3/04886 715/741 |
| 2006/0005039 A1* | 1/2006 | Hsieh | G06F 21/36 713/183 |
| 2007/0250920 A1* | 10/2007 | Lindsay | G06F 21/31 726/7 |
| 2007/0277235 A1* | 11/2007 | Barrett | G06F 21/31 726/12 |
| 2008/0148366 A1* | 6/2008 | Wahl | G06F 21/36 726/4 |
| 2009/0037986 A1 | 2/2009 | Baker | |
| 2009/0302103 A1 | 12/2009 | Kolinski-Schultz | |
| 2009/0313694 A1* | 12/2009 | Mates | G06F 21/36 726/21 |
| 2010/0024022 A1* | 1/2010 | Wells | H04L 63/0838 726/7 |
| 2010/0076891 A1* | 3/2010 | Vanmoor | G06Q 20/04 705/44 |
| 2011/0090097 A1* | 4/2011 | Beshke | B60R 25/23 341/20 |
| 2012/0130714 A1 | 5/2012 | Zeljkovic | |
| 2013/0132091 A1 | 5/2013 | Skerpac | |
| 2013/0159196 A1 | 6/2013 | DiZoglio | |
| 2013/0291096 A1* | 10/2013 | Finnan | G06F 21/31 726/19 |
| 2013/0298208 A1* | 11/2013 | Ayed | G06F 21/00 726/6 |
| 2014/0046664 A1* | 2/2014 | Sarkar | H04W 12/06 704/246 |
| 2014/0130127 A1 | 5/2014 | Toole | |
| 2014/0164245 A1* | 6/2014 | Qiao | G06Q 30/06 705/44 |
| 2014/0164782 A1* | 6/2014 | Lo | G06F 21/35 713/184 |
| 2014/0179283 A1* | 6/2014 | Kwon | H04W 4/16 455/414.1 |
| 2014/0283022 A1* | 9/2014 | Beloncik | G06F 21/32 726/19 |
| 2014/0343943 A1* | 11/2014 | Al-Telmissani | G10L 17/00 704/246 |
| 2015/0012750 A1* | 1/2015 | Matsumoto | H04L 63/0876 713/171 |
| 2015/0128234 A1* | 5/2015 | Xavier | H04L 63/0869 726/6 |
| 2016/0012823 A1* | 1/2016 | Roos | G10L 17/24 704/239 |
| 2016/0328552 A1* | 11/2016 | Finnan | G06F 21/31 |

OTHER PUBLICATIONS http://opusresearch.net/wordpress/pdfs/SpeechPro_VBCLondon2014.pdf, Speechpro, Biometric Authentication, presented at VBC London 2014 (The Voice Security & Authentication Conference), Nov. 18, 2014, 35 pages.

\* cited by examiner

| 404 | 406 | | | 408 | |
|---|---|---|---|---|---|
| 1 | 2 | 3 | 1 | 2 | 3 |
| car | cat | ball | key | pen | fire |
| 4 | 5 | 6 | 4 | 5 | 6 |
| run | pen | fire | fan | car | run |
| 7 | 8 | 9 | 7 | 8 | 9 |
| fan | lid | bear | lid | bear | ball |
| 1 | 2 | 3 | 1 | 2 | 3 |
| egg | fire | key | toy | bear | run |
| 4 | 5 | 6 | 4 | 5 | 6 |
| pen | ball | bear | milk | dog | cat |
| 7 | 8 | 9 | 7 | 8 | 9 |
| lid | nail | car | car | egg | fire |
| 414 | 410 | | | 412 | |

ACCESS CODE OBFUSCATION USING SPEECH INPUT

CROSS-REFERENCE TO RELATED APPLICATION

This application is related to U.S. patent application Ser. No. 14/331,183 filed on Jul. 14, 2014, the entire contents of which are hereby incorporated by reference.

BACKGROUND

This specification relates to user authentication using access codes.

A secured system is a system that limits access in one or more ways. An access code, such as a password or a personal identification number (PIN), is a commonly used security measure for verifying the identity of a user requesting access to a secured system. A password can be entered using a keyboard, and a PIN can be entered using a PIN pad. However, the security of the system may be threatened by an attacker using techniques such as shoulder surfing, keyboard sniffing, and capturing images of the user in order to observe the user entering the access code. Examples of common techniques used to improve the security of a system include not displaying the access code on the display screen or obscuring each character of the access code using asterisks or bullets as the access code is being entered by the user, using a sophisticated display that prevents viewing past certain angles, and surrounding a keypad with a shield to limit its view to bystanders.

SUMMARY

This specification describes technologies relating to obfuscating a user's access code while being entered by a user who is attempting to access a secured system. The secured system employs speech recognition technology, which uses audio signals corresponding to utterances spoken by a user. The system presents the user with prompts corresponding to the access code along with other prompts not corresponding to the access code. In some implementations, the system presents the user with an indication of where on a display of a client device the prompts corresponding to the access code will be presented. The system receives an audio signal that includes speech spoken by the user and determines whether the audio signal includes the user speaking the correct prompts—i.e., those corresponding to the access code rather than those not corresponding to the access code. In some implementations, the secured system employs speaker recognition technology to analyze the audio characteristics of the audio signal and to verify the identity of the user speaking the prompts.

In one aspect, the subject matter described in this specification can be implemented in methods, apparatus, and systems that may include operations of receiving an identifier; obtaining a plurality of prompts using the identifier, wherein a first prompt corresponds to a first character of an access code, and a second prompt corresponds to a second character of the access code; causing the first prompt to be presented on a display at a first time, where a location of the first prompt on the display corresponds to a first alternative; causing a third prompt to be presented on the display at the first time, where a location of the third prompt corresponds to a second alternative; causing the second prompt to be presented on the display at a second time, where a location of the second prompt corresponds to the first alternative; causing a fourth prompt to be presented on the display at the second time, where a location of the fourth prompt corresponds to the second alternative; receiving an audio signal comprising speech spoken by a user; and determining whether the audio signal comprises the user speaking the first prompt followed by the second prompt.

These and other implementations can optionally include one or more of the following features. The first alternative may correspond to predetermined locations associated with the identifier. The operations may include causing an indication to be presented, wherein the indication corresponds to the first alternative. The indication may be an audible indication. The operations may include causing the indication to be presented at a location on the display corresponding to a predetermined location associated with the identifier. The operations may include causing the indication to be presented at a location on the display that differs from a location corresponding to an immediately preceding presentation of the indication. The operations may include causing the indication to be presented at a location on the display corresponding to the first alternative. The operations may include causing the indication to be presented at a location on the display that differs from the first alternative. A first set of one or more other prompts of the plurality of prompts may correspond to one or more characters other than the first character, a second set of the one or more other prompts may correspond to one or more characters other than the second character, and the operations may include causing the first set of the one or more other prompts to be presented on the display at the first time; and causing the second set of the one or more other prompts to be presented on the display at the second time. The first alternative may include a first set of rows for presenting prompts corresponding to the access code, and the second alternative may include a second set of rows for presenting prompts not corresponding to the access code. The first alternative may include a first set of cells for presenting prompts corresponding to the access code, and the second alternative may include a second set of cells for presenting prompts not corresponding to the access code. The operations may include causing the first prompt and the third prompt to be presented on the display for a time period after the first time; causing the second prompt and the fourth prompt to be presented on the display at the second time after the time period has elapsed; and causing the second prompt and the fourth prompt to be presented on the display for a time period after the second time. The time period may be predetermined based on previous interactions associated with the identifier. The time period may be a decrease of a time period associated with the identifier. Receiving the audio signal comprising speech spoken by the user may include receiving a first audio signal comprising speech spoken by the user after causing the first prompt and the third prompt to be presented and before causing the second prompt and the fourth prompt to be presented; and receiving a second audio signal comprising speech spoken by the user after causing the second prompt and the fourth prompt to be presented. The operations may include training a speaker recognition model using the audio signal comprising speech spoken by the user. The operations may include determining whether audio characteristics of the audio signal comprising the speech spoken by the user corresponds to audio characteristics of speech included in a speaker recognition model associated with the identifier. Receiving the identifier may include receiving a request to access a secured system, the request including the identifier. The operations may include granting access to the secured system in response to a result of the determining. The operations may include denying access to the secured system in response to a result of the determining.

The subject matter described in this specification may be implemented to realize one or more of the following potential advantages. The use of speech input to obfuscate a user's access code may prevent an attacker from obtaining the user's access code using techniques such as shoulder surfing, keyboard sniffing, and capturing images of the user entering the access code. The system allows the use of speech recognition for entry of the access code and speaker recognition as an extra security measure for verifying the identity of the user entering the access code.

Details of one or more implementations of the subject matter described in this specification are set forth in the accompanying drawings and description below. Other features, aspects, and potential advantages of the subject matter will become apparent from the description, the drawings, and the claims.

BRIEF DESCRIPTION OF THE DRAWINGS

FIG. 4 shows an example of prompts presented on a display to a user requesting access to a secured system.

DETAILED DESCRIPTION

Figure 1:
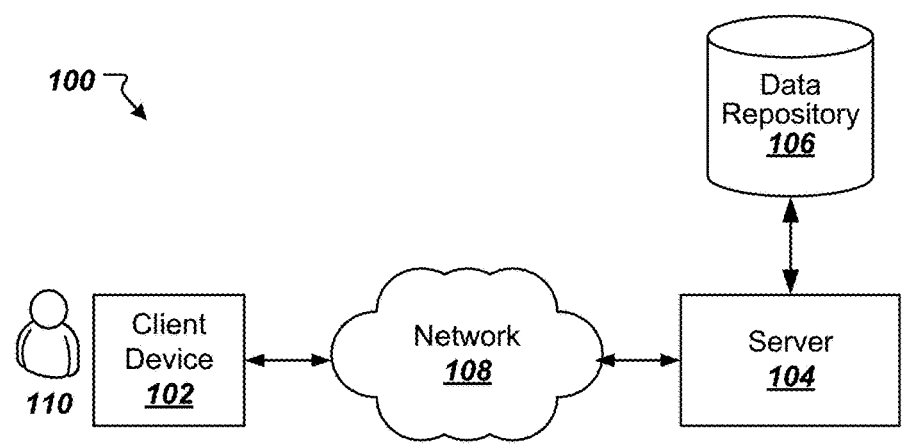
FIG. 1 is a block diagram showing an example of an environment that includes a secured system.

FIG. 1 is a block diagram showing an example of an environment 100 that includes a secured system. The environment 100 includes a client device 102, one or more servers 104, one or more data repositories 106, and one or more networks 108 for interconnecting these components. Any one or more of the components 102, 104, 106, and/or 108 may be the secured system to which a user 110 seeks access. The one or more networks may include a local area network (LAN), a wide-area network (WAN), the Internet, a wired network, a wireless network, or a combination thereof.

The client device 102 is used by the user 110 and can be any device capable of accessing a secured system, or can be a secured system in and of itself. Examples of client devices 102 include personal computers, mobile phones, tablets, game consoles, personal digital assistants, and automated teller machines (ATMs). In some implementations, the secured system is the client device 102 that requires the user 110 to enter an access code in order to use the client device 102 or access information stored on the client device 102.

In some implementations, the secured system includes the server 104 that manages a secured account, such as a financial account or an e-mail account. The server 104 controls access to the secured account by requiring the user 110 to enter an access code to retrieve information, perform an activity, or conduct a transaction associated with the secured account. The server 104 may retrieve user and account information from the data repository 106 and provide account information to the client device 102 for presentation to the user 110.

The secured system employs speech recognition technology, which uses audio signals that include speech spoken by a user. The secured system controls access to its resources and information by causing the client device 102 to present to the user 110 not only prompts corresponding to the access code but also false prompts that serve to obfuscate the access code as it is being entered by the user 110. The secured system receives an audio signal that includes speech spoken by the user 110 and determines whether the audio signal includes the user speaking the prompts corresponding to the access code. The access code is obfuscated by the user's knowledge of the identity of the prompts that correspond to the access code.

The prompts may be text or images. For example, the secured system may cause the client device 102 to present words to the user 110. The user speaks the words corresponding to the access code to access the secured system. As another example, the secured system may cause the client device 102 to present to the user 110 pictures either concurrently or sequentially. The pictures may be, for example, faces of the user's friends, the user's pets, places that the user recognizes, and the like. The pictures may represent items or attributes of items such as colors, shapes, categories, and the like. The pictures may be identifiable only by the user and not a stranger. The user, knowing the identities, the items, or the attributes of the pictures, speaks the words corresponding to the pictures in a specified order. The access code is obfuscated by the user's knowledge of the identity, the items, or the attributes of the items depicted in the pictures.

In some implementations, the secured system causes the client device 102 to present, along with the prompts that correspond to the access code, prompts that do not correspond to the access code. The user 110 knows the locations on the display of the client device 102 where the prompts that correspond to the access code are presented. In some implementations, the locations are preselected by the user 110 as, for example, part of setting up an account with the secured system.

In some implementations, the locations are selected by the secured system when the user 110 requests access to the secured system, and the secured system causes an indication to be presented to the user 110 that indicates where the prompts corresponding to the access code will be presented on the display of the client device 102. In some implementations, the indication is a visual indication that is preselected by the user 110 as, for example, part of setting up access to the secured system and that is presented to the user 110 on the display of the client device 102. In some implementations, the indication is an audible indication. The secured system causes the audible indication to be presented to the user 110 by, for example, sending an audio signal through ear phones connected to the client device 102 or a telephone call to the user 110.

In some implementations, the secured system employs speech recognition technology. The account information for the user 110 may include a speaker recognition model. The system may determine whether audio characteristics of the audio signal that includes speech spoken by the user 110 match audio characteristics of speech included in the speaker recognition model. The system may make this determination by analyzing the audio signal using any suitable speaker recognition technique or a combination of techniques in combination with the speaker recognition model.

Figure 2:
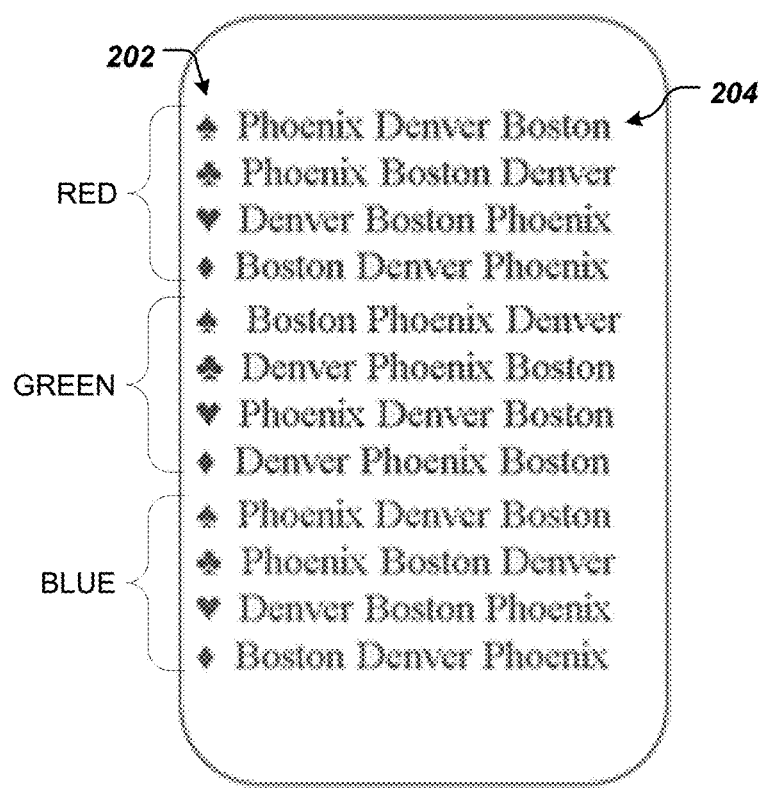
FIGS. 2 and 3a-3f show examples of indications and prompts presented on a display to a user requesting access to a secured system.

Various implementations are described in detail below with reference to FIGS. 2-9. FIG. 2 shows an example of indications 202 (e.g., playing card symbols corresponding to spades, clubs, hearts or diamonds) and prompts 204 (e.g., the words "Phoenix," "Denver," or "Boston") presented on a display to a user requesting access to a secured system. In this example, each row presented on the display includes an indication 202 and a set of three prompts 204. In this example, the indications 202 are colored symbols such as a red, green, or blue spade, clover, heart, or diamond. The set of prompts 204 are a set of words presented on the display. Other layouts of indications and prompts on the display are possible.

To gain access to the secured system, the user knows to speak the set of prompts that are presented in the same row as a preselected indication. In some implementations, the indication was preselected by the user when the user set up an account with the secured system. In some implementations, the system selects the indication when the user requests access to the system, and the system discretely and audibly informs the user of the indication by, for example, calling a phone number associated with the user's account and verbally providing a description of the secret symbol to the user over the phone. In the example shown in FIG. 2, a user who knows that the green diamond is the preselected indication would speak the words "Denver Phoenix Boston" to gain access to the secured system. A user who speaks words other than "Denver Phoenix Boston" would be denied access to the system.

The same set of prompts may correspond to more than one colored symbol. In FIG. 2, for example, the set of words "Phoenix Denver Boston" corresponds to three different symbols, namely, the red spade, the green heart, and the blue spade. Consequently, a bystander listening to and observing the user speaking the words "Phoenix Denver Boston" would not know which one of the red spade, green heart, or blue spade is the user's preselected colored symbol. Different sets of prompts would be presented on the display adjacent the symbols for consecutive requests to access the secured system.

The preselected indication may be presented at the same location of the display for each request to access the secured system, or presented at different locations between consecutive requests. For example, the colored symbols can be presented in the same row order at the same locations as shown in FIG. 2 for each request to access the system. Alternatively, the colored symbols may be presented in a row order for a subsequent request that is different than the sequence shown in FIG. 2, such as the green symbols in the first four rows, followed by the blue symbols, and then the red symbols in the last four rows.

FIGS. 3a-3f show examples of PIN pads 302, 304, 306 with indications and PIN pads 308, 310, 312 with prompts presented on a display to a user requesting access to a secured system. In the examples shown in FIGS. 3a-3f, the indications and the prompts are presented in cells, e.g., cell 314, that correspond to digits of a PIN pad. The indications indicate which row of prompts the user should read in the cells for the corresponding digits displayed on the PIN pad. For the examples shown in FIGS. 3a, 3c, and 3e, the indications are denoted by "[---]" presented in the row of the cell from which the corresponding prompt should be read. The rows from which the user should read the prompts corresponding to the digits of the PIN pad may be randomly selected by the system. Other suitable indicia may be used, e.g., an up or a down arrow.

When the user requests access to the system, the system presents the indications in the cells of the PIN pad followed by the prompts in the cells of the PIN pad for each digit of the PIN pad. Presenting two prompts as opposed to just one prompt for each digit may increase the difficulty for an observer to determine the user's access code. To further increase the difficulty for an observer to determine the user's access code, the same prompt may be presented for two or more different digits presented on the PIN pad.

Figures 3A, 3B:
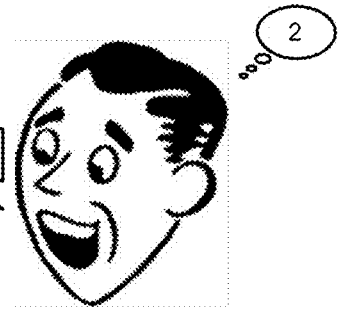
Figures 3C, 3D:
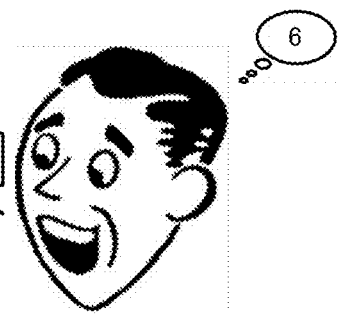
Figures 3E, 3F:
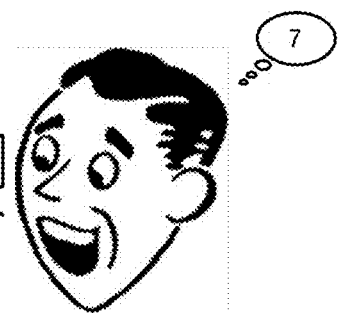

For example, the user has a preselected access code of "267". When the user requests access to the system, the system causes the display to present the PIN pad 302 with indications in the cells corresponding to the digits of the PIN pad as shown in FIG. 3a. The user looks for the indication in the cell corresponding to the digit "2", which directs the user to read the prompt that will be presented in the bottom row of the cell for the digit "2". After presenting the PIN pad 302 with the indications, the system causes the display to present the PIN pad 308 with prompts to the user as shown in FIG. 3b. To enter the digit "2", the user would speak the word "pen" presented in the bottom row of the cell for the digit "2". The system then causes the display to present the PIN pad 304 with indications for the next digit of the access code as shown in FIG. 3c. The user looks for the indication in the cell corresponding to the digit "6", which directs the user to read the prompt that will be presented in the top row of the cell for the digit "6". After presenting the PIN pad 304 with the indications, the system causes the display to present the PIN pad 310 with prompts to the user as shown in FIG. 3d. To enter the digit "6", the user would speak the word "bear" presented in the top row of the cell for the digit "6". The system then causes the display to present the PIN Pad 306 with indications for the next digit of the access code as shown in FIG. 3e. The user looks for the indication in the cell corresponding to the digit "7", which directs the user to read the prompt that will be presented in the top row of the cell for the digit "7". After presenting the PIN pad 306 with the indications, the system causes the display to present the PIN Pad 312 with prompts to the user as shown in FIG. 3f. To enter the digit "7", the user would speak the word "milk" presented in the top row of the cell for the digit "7".

The system may cause the display to present each of the PIN pads 302, 304, 306 with indications and the PIN pads 308, 310, 312 with prompts for a predetermined time period. The predetermined time period may be based on the user's experience with interacting with the system, the user's success in accessing the system, the potential measured delay of the user when speaking the words, or any combination thereof. The predetermined time period may be longer for new users and may decrease as the user gains experience resulting in a maximum allowable time period for the particular user to speak each prompt corresponding to the access code. This maximum allowable time period prevents a user from lowering the speed for speaking each prompt after the user has demonstrated a proficiency for a faster speed, which prevents an attacker from lowering the speed to make a replay attack easier to perform.

FIG. 4 shows an example of a display 404 with prompts presented to a user requesting access to a secured system. In the example shown in FIG. 4, the prompts are words presented in cells, e.g., cell 414, that correspond to digits of four PIN pads 406, 408, 410, 412. A prompt is presented in a cell for each digit of the four PIN pads 406, 408, 410, 412. Other layouts of prompts on the display are possible.

For the example shown in FIG. 4, a user selects a particular PIN pad during set up of an account with the secured system, or the system informs the user of the particular PIN pad from which the prompts should be read when the user requests access to the system. To gain access to the secured system, the user speaks the prompts that are presented in the cells of the preselected PIN pad corresponding to the access code. For example, a user specifies an access code of "385" during set up of an account with the secured system and knows that the PIN pad 408 located at the upper right quadrant of the display includes the prompts corresponding to the access code. When the user requests access to the system, the system causes the display 404 to present the prompts in the PIN pads 406, 408, 410, 412. The user knows to speak words "fire bear car" presented in the cells of the PIN pad 408 corresponding to the user's access code "385". A user who speaks words other than "fire bear car" would be denied access to the system.

The same prompt may be presented for two or more digits of the PIN pads 406, 408, 410, 412. In FIG. 4, for example, the word "fire" is presented in the cell for the digit "6" of PIN pad 406, in the cell for the digit "3" for the PIN pad 408, in the cell for the digit "2" of PIN pad 410, and in the cell for the digit "9" of PIN pad 412. A bystander listening to and observing the user speaking the word "fire" would not know which one of the digits "6", "3", "2", or "9" is a digit of the user's access code. Different prompts would be presented in the cells of the PIN pads 406, 408, 410, 412 for consecutive requests to access the secured system.

Figure 5:
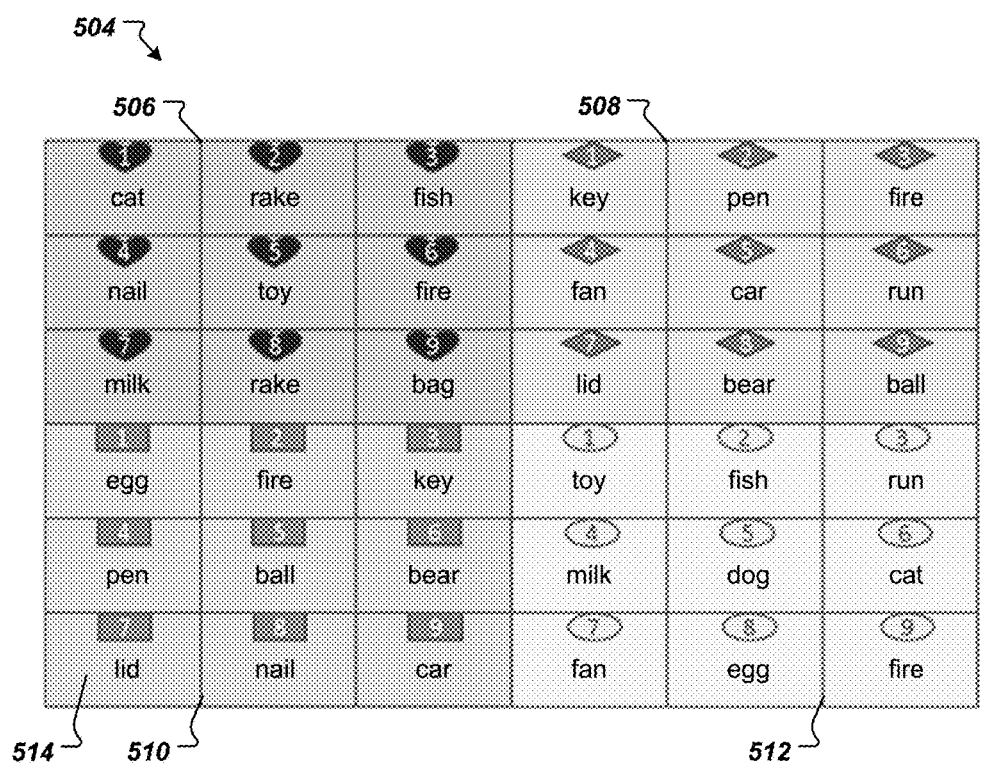
FIGS. 5, 6a, 6b, 7a, and 7b show examples of indications and prompts presented on a display to a user requesting access to a secured system.
Figure 6:
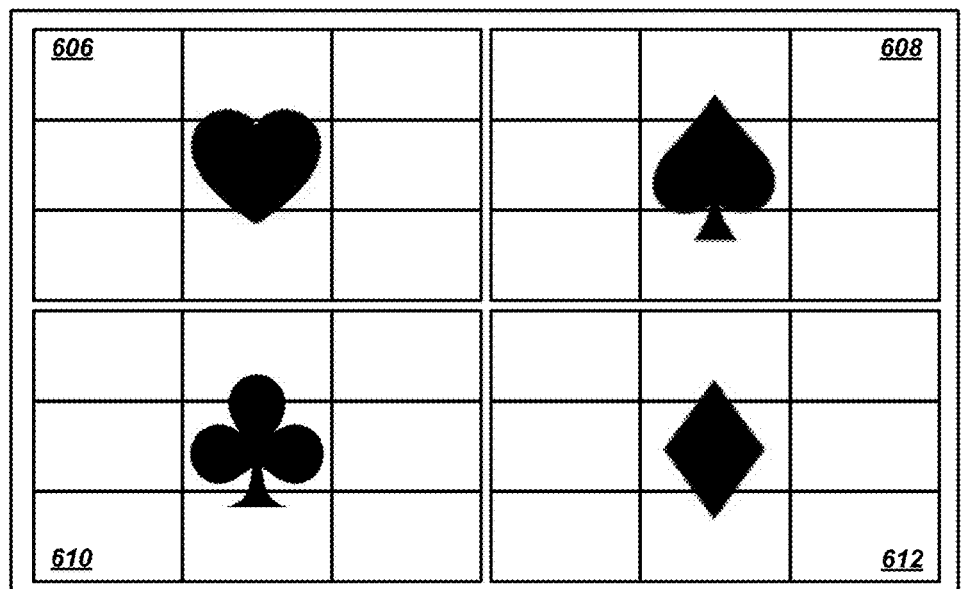
Figure 7:
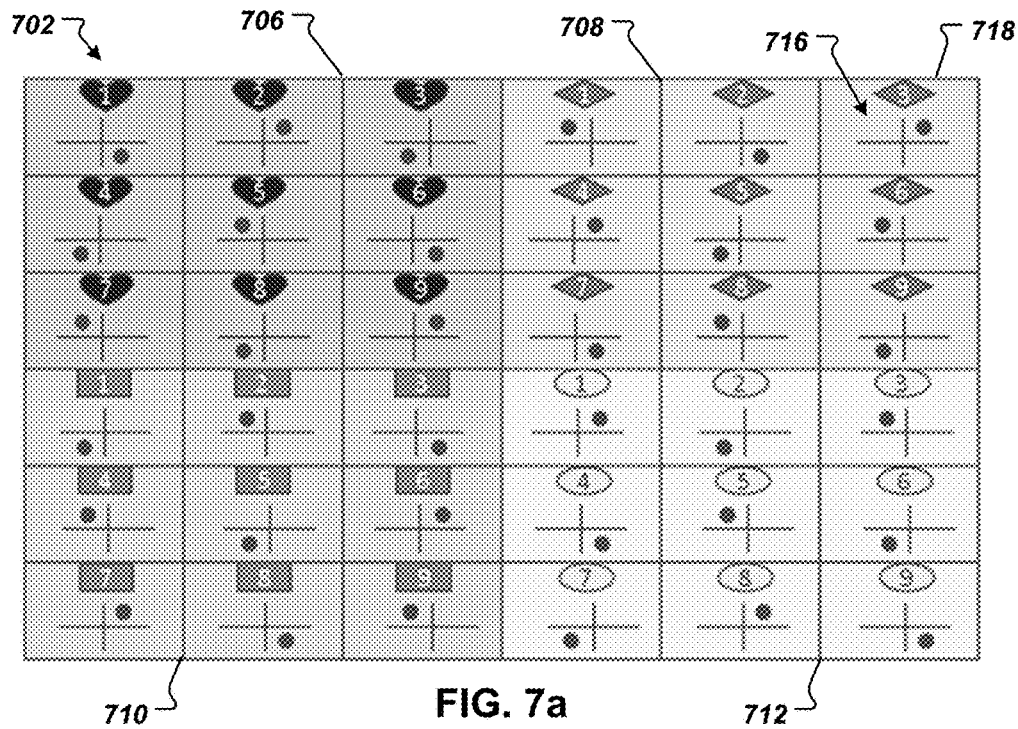

FIG. 5 shows an example of a display 504 with prompts presented to a user requesting access to a secured system. In the example shown in FIG. 5, the prompts are words presented in cells, e.g., cell 514, that correspond to digits of four PIN pads 506, 508, 510, 512. A prompt is presented in a cell for each digit of the four PIN pads 506, 508, 510, 512. Other layouts of prompts on the display are possible.

For the example shown in FIG. 5, a user selects an indication, e.g., a particular color during set up of an account with the secured system. When the user requests access to the system, each of the PIN pads 506, 508, 510, 512 is presented with a different color background, and one of the PIN pads 506, 508, 510, 512 is presented with a background in the color preselected by the user. The user knows to speak the prompts in the cells corresponding to the digits of the access code that are included in the PIN pad presented with the preselected background color.

For example, the user selects the color red and specifies an access code of "953" during set up of an account with the secured system. When the user requests access to the system, the system causes the display 504 to present the prompts in the PIN pads 506, 508, 510, 512. The system causes the display 504 to present the PIN pad 506 with a green background, the PIN pad 508 with a blue background, the PIN pad 510 with a red background, and the PIN pad 512 with a white background. The user knows to speak the words "car ball key" presented in the cells corresponding to the user's access code "953" from the PIN pad 510 with the red background. A user who speaks words other than "car ball key" would be denied access to the system. For a subsequent access, the system may change the background colors of the PIN pads 506, 508, 510, 512 so that a different PIN pad is presented with the red background.

Other indications notifying the user of which PIN pad includes the prompts corresponding to the access code are possible. For example, in FIG. 5, the digits of the PIN pads 506, 508, 510, 512 are presented within a symbol, such as a heart, a diamond, a rectangle, or an oval. A user would select a particular symbol during set up of an account with the secured system. When requesting access to the secured system, the user knows to speak the prompts presented in the cells corresponding to the digits of the access code from the PIN pad with the digits presented within the user's preselected symbol.

For example, the user selects the oval symbol and specifies an access code of "854" during set up of an account with the secured system. When the user requests access to the system, the system causes the display 504 to present the prompts in the PIN pads 506, 508, 510, 512. The system causes the display 504 to present each digit of the PIN pad 506 inside a heart symbol, each digit of the PIN pad 508 inside a diamond symbol, each digit of the PIN pad 510 inside a rectangle symbol, and each digit of the PIN pad 512 inside an oval. The user knows to speak the words "egg dog milk" presented in the cells corresponding to the user's access code "854" from the PIN pad 512 where the digits are presented inside the oval symbol. A user who speaks words other than "egg dog milk" would be denied access to the system. For a subsequent access, the system may change the symbols that enclose the digits of the PIN pads 506, 508, 510, 512 so that a different PIN pad is presented with digits inside the oval symbol.

The same prompt may be presented for two or more digits of the PIN pads 506, 508, 510, 512. In FIG. 5, for example, the word "fire" is presented in the cell for the digit "6" of PIN pad 506, in the cell for the digit "3" for the PIN pad 508, in the cell for the digit "2" of PIN pad 510, and in the cell for the digit "9" of PIN pad 512. A bystander listening to and observing the user speaking the word "fire" would not know which one of the digits "6", "3", "2", or "9" is a digit of the user's access code. Different prompts would be presented in the cells of the PIN pads 506, 508, 510, 512 for consecutive requests to access the secured system.

FIG. 6a shows an example of a display 602 with indications presented to a user requesting access to a secured system, and FIG. 6b shows an example of the display 604 with prompts presented to the user requesting access to the secured system. In the example shown in FIGS. 6a and 6b, the indications and prompts are presented in a configuration that includes four PIN pads 606, 608, 610, 612. The indications may be any images or symbols that are easily identified by the user. In this example, the indications are symbols such as a spade, clover, heart, or diamond that are overlaid on the PIN pads 606, 608, 610, 612 to inform the user from which PIN pad to read the prompts. The prompts are words presented in cells, e.g., cell 614, corresponding to digits of the PIN pads 606, 608, 610, 612. Other layouts of indications and prompts on the display are possible.

When a user requests access to a secured system, the system causes the display 602 to present the indications overlaid on the PIN pads 606, 608, 610, 612 as shown in FIG. 6a for a predetermined period of time. The indications inform the user of the PIN pad from which the prompts should be read to enter the access code. For example, a user who preselected the spade as the secret symbol would be informed by the indications that the prompts corresponding to the user's access code will be presented in the PIN pad 608 on which the secret symbol was overlaid. The system then causes the display 604 to present the prompts as shown in FIG. 6b, and the user would read the prompts presented in the cells of the PIN pad 608 corresponding to the access code. For a subsequent access, the system may change the locations of the symbols so that the secret symbol is overlaid on a different PIN pad.

FIG. 7a shows an example of a display 702 with indications presented to a user requesting access to a secured system, and FIG. 7b shows an example of a display 704 with prompts presented to the user requesting access to the secured system. In the example shown in FIGS. 7a and 7b, the indications and the prompts are presented in a configuration that includes four PIN pads 706, 708, 710, 712. The prompts are words presented in cells, e.g., a cell 714, corresponding to digits of the PIN pads 706, 708, 710, 712. Other layouts of indications and prompts on the display are possible.

In the example shown in FIG. 7a, the indications include redirection symbols, e.g., the redirection symbol 716 in the cell 718 of PIN pad 708. The redirection symbol is a cross representing boundaries of the quadrants of the display 702 and a circle denoting a quadrant of the display 702. The redirection symbol informs the user of the PIN pad or quadrant of the display 702 from which to read the prompts corresponding to the user's access code. Suitable redirection symbols other than those shown in FIG. 7a may be used. For example, in implementations that include two rows of prompts for each cell, the circle in the redirection symbol can be replaced with a semicircle or an arrow informing the user of the PIN pad and the rows of the cells from which to read the prompts corresponding to the user's access code.

In some implementations, the user selects a particular PIN pad or quadrant of the display and a secret number when the user sets up an account with the secured system. When the user requests access to the secured system, the system causes the display to present the indications including the redirection symbols in the cells of the PIN pads 706, 708, 710, 712 as shown in FIG. 7a. Using the display 702 shown in FIG. 7a, the user locates the particular PIN pad or quadrant of the display that was selected during account set up. The user then locates the secret number in the particular PIN pad or quadrant of the display. The redirection symbol contained in the cell corresponding to the secret number presented in the particular PIN pad informs the user of the PIN pad or quadrant of the display from which to read the prompts corresponding to the user's access code.

For example, the user selects the PIN pad 706 located at the upper left quadrant of the display and the secret number "2" when the user sets up an account with the secured system. When the user requests access to the secured system, the system causes the display to present the indications including the redirection symbols in the cells of the PIN pads 706, 708, 710, 712 as shown in FIG. 7a. The user locates the PIN pad 706 at the upper left quadrant of the display and locates the number "2" in the PIN pad 706. The redirection symbol in the cell corresponding to the number "2" in the PIN pad 706 informs the user that the PIN pad 708 will present the prompts for the access code that the user should speak to access the system. After presenting the display 702 with indications shown in FIG. 7a, the system causes the display to present the display 704 with prompts to the user as shown in FIG. 7b.

In some implementations, the indications may also include background colors of the PIN pads, symbols that enclose the digits of the PIN pads, other suitable indications, or a combination. When the user sets up an account with the secured system, the user selects a secret indication, such as a background color or a symbol, and a secret number. When the user requests access to the secured system, the system causes the display 702 to present the indications including the secret indication and the redirection symbol as shown in FIG. 7a. The user looks for the secret indication and the secret number on the display to identify a redirection symbol. The redirection symbol informs the user of the PIN pad or quadrant of the display from which to read the prompts corresponding to the user's access code.

For example, the user selects a rectangle as the secret symbol and the secret number "5" when the user sets up an account with the secured system. When the user requests access to the secured system, the system causes the display 702 to present the indications as shown in FIG. 7a. The user locates the PIN pad 710 with the digits that are enclosed by rectangles. The user then locates the secret number "5" in the PIN pad 710. The redirection symbol in the cell corresponding to the number "5" in the PIN pad 710 informs the user that the PIN pad 710 will present the prompts for the access code that the user should speak to access the system. After presenting the indications shown in FIG. 7a, the system causes the display 704 to present the prompts to the user as shown in FIG. 7b. For a subsequent access, the system may change the indications presented with the PIN pads 706, 708, 710, 712 so that a different PIN pad is presented with the secret indication. The system may also change the redirection symbol informing the user of the PIN pad or quadrant of the display from which to read the prompts corresponding to the user's access code so that the redirection symbol directs the user to a different PIN pad or quadrant of the display.

Figure 8:
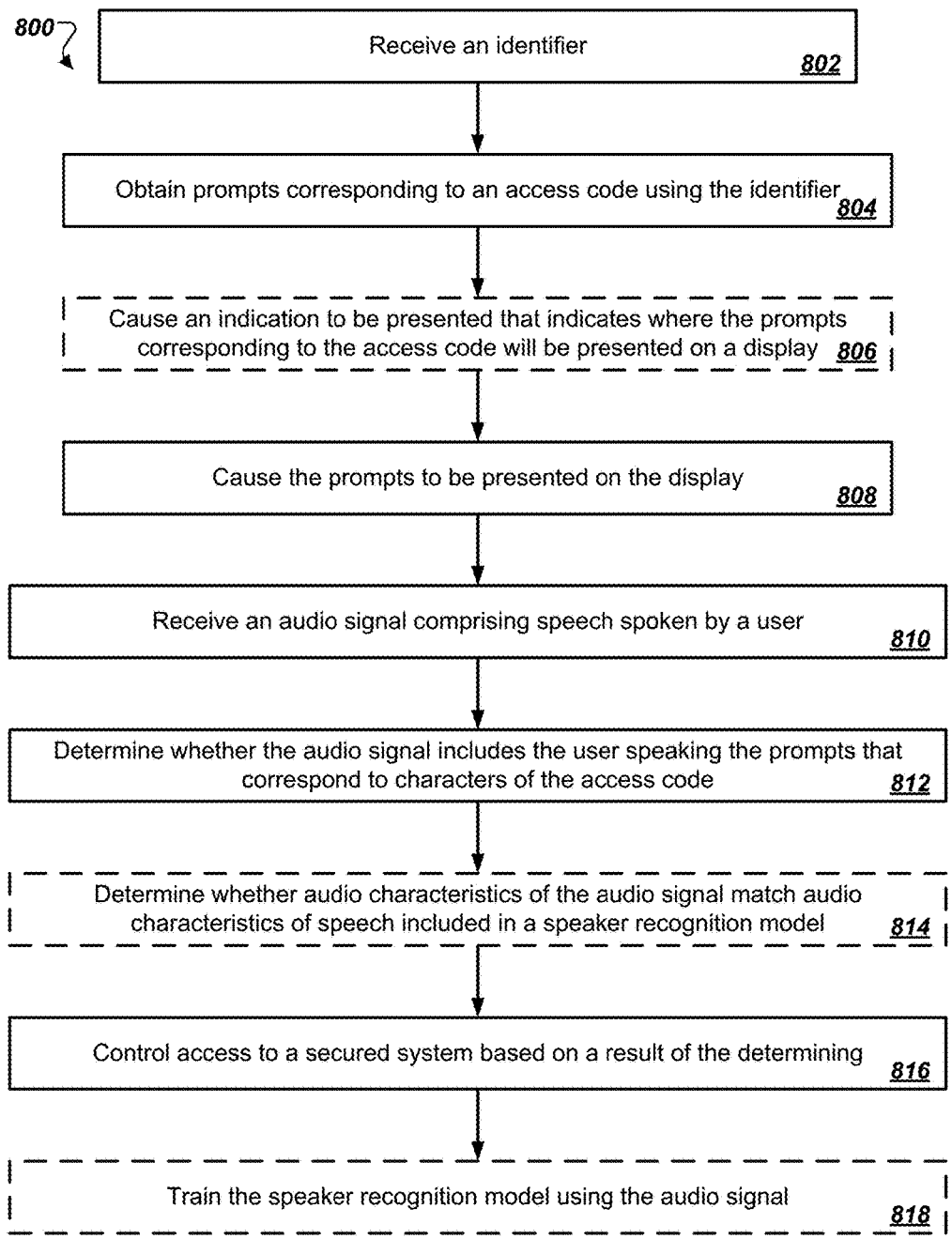
FIGS. 8 and 9 are flowcharts of examples of processes for controlling access to a secured system.

FIG. 8 is a flowchart of an example of a process 800 for controlling access to a secured system. The process 800 may be performed by a secured system, such as client device 102 or server 104 of FIG. 1, or a combination thereof. The process 800 may include any combination of the details discussed above.

The system receives an identifier (802). The identifier may be a username, an e-mail address, an account number, or other suitable identifier that the system uses to identify an account or a user of an account managed by the system. The identifier may have been selected by a user when the user set up an account with the system, or assigned to the user by the system. The identifier may be included in a request sent from a client device to a server in response to user input to access the system. The identifier may have been entered by the user using a keyboard, derived from the user's speech, extracted from a physical card such as a debit or credit card, or received through other suitable data entry techniques.

The system obtains prompts corresponding to an access code using the identifier (804). To obtain the prompts, the system uses the identifier to retrieve account information from a database. The account information includes an access code for accessing the system. The access code may be, for example, a password or a PIN, and may include characters such as letters, numbers, or punctuation marks. For each character of the access code, the system associates a prompt with the character. The prompts associated with the characters of the access code are selected from a set of prompts that are to be presented to the user. The set of prompts may have been stored in the database as part of the account information associated with the identifier or may be available for the system to use with all identifiers.

In some implementations, the system causes an indication to be presented (806). As described above with reference to FIGS. 2-7, the indication informs the user of the location where the prompts corresponding to the access code will be presented on the display. The indication may be a visual indication presented on the display, an audible indication presented to the user through, for example, a telephone connection established by the system dialing a telephone number associated with the account, or a combination. When a visual indication is presented on the display, other indications may also be presented for alternative locations where prompts not corresponding to the access code will be presented on the display. The indication, which informs the user of the locations where the prompts corresponding to the access code will be presented, corresponds to a first alternative for characters that are included in the access code, and the other indications correspond to other alternatives for characters that are both included and excluded from the access code. For example, in the implementations described above with reference to FIGS. 3a-3f, the first alternative for the characters included in the access code corresponds to rows where indications are shown, and the second alternative corresponds to rows where no indications are shown. As another example, in the implementations described above with reference to FIGS. 5-7b, the first alternative for the characters included in the access code corresponds to a PIN pad from which the prompts should be read, and the second alternative corresponds to another PIN pad.

The system causes the prompts to be presented on the display (808). The system causes the prompts corresponding to the access code to be presented at locations corresponding to a first alternative and prompts not corresponding to the access code to be presented at locations corresponding to a second alternative. As described with reference to FIG. 2, for example, the first alternative is a row of prompts corresponding to the access code, and the second alternative is another row of prompts not corresponding to the access code. As another example described above with reference to FIG. 3, the first alternative includes a particular row of multiple rows within a cell for a digit of the PIN pad that corresponds to a digit of the access code, and the second alternative includes the other row of the multiple rows within the cell corresponding to the digit of the PIN pad. As yet another example described above with reference to FIGS. 4-7, the first alternative includes cells of a particular PIN pad of multiple PIN pads or a quadrant of the display, and the second alternative includes another PIN pad of the multiple PIN pads or another quadrant of the display.

In some implementations, the system causes the display to present a different set of indications and a different set of prompts for each character of the access code. As an example described above with reference to FIG. 3, the system causes the display to present a first set of indications for a specified time period followed by a first set of prompts for a specified time period, and a second set of indications for a specified time period followed by a second set of prompts for a specified time period. The first set of prompts would include a prompt corresponding to the first character of the access code, and the second set of prompts would include a prompt corresponding to the second character of the access code.

In some implementations, the system causes the display to present one set of indications when the user requests access to the system and a different set of prompts for each character of the access code. As an example that can be implemented in any one of the examples described above with reference to FIGS. 4-7, the system causes the display to present the indication for a specified time period in response to a user's request to access the system. After the indication is presented, the system causes the display to present a first set of prompts for a specified time period followed by a second set of prompts for a specified time period. The first set of prompts would include a prompt corresponding to the first character of the access code, and the second set of prompts would include a prompt corresponding to the second character of the access code.

The system receives an audio signal that includes speech spoken by a user (810). The system can receive the audio signal through, for example, a microphone connected to the client device or a telephone connection established between the system and a stationary or mobile phone associated with the account.

The system then determines whether the audio signal includes the user speaking the prompts that correspond to the characters of the access code (812). The system may make this determination by analyzing the audio signal using any suitable speech recognition technique or a combination of techniques. For example, the system may compare the audio signal of the speech spoken by the user to speech recognition models (e.g., hidden Markov models and/or Gaussian mixture models) associated with the prompts corresponding to the digits of the access code. As another example, the system may convert the audio signal of the speech spoken by the user to text and compare the text of the speech with text versions of the prompts corresponding to the digits of the access code.

In some implementations, the system may be optimized to perform speech recognition for a small set of possible prompts referred to as a codebook. The account information for the user may include the codebook. The codebook for the user may change over time. For example, the system may insert a new word into a PIN pad. After the user successfully accesses the system using the new word, the system can add the new word to the codebook to expand the user's vocabulary. The system can remove prompts from the codebook that are difficult for the user to recognize or pronounce, or that are difficult for the system to understand. The system can associate each prompt in the codebook with an expiration time so that each prompt is used for a certain time period and then removed from the codebook to prevent attackers from gaining familiarity with the prompts in the user's codebook.

In some implementations, the account information may include a speaker recognition model for a user associated with the account. In such implementations, the system also determines whether audio characteristics of the audio signal match audio characteristics of speech included in a speaker recognition model (814). The system may make this determination by analyzing the audio signal using any suitable speaker recognition technique or a combination of techniques in combination with the speaker recognition model (e.g., by using a stored i-vector for the user).

The system controls access to the system based on a result of the determining (816). If the system determines that the audio signal does not include the user speaking the prompts that correspond to the characters of the access code, the system denies the user access to the system. In implementations where the system employs speaker recognition, if the system determines that the audio characteristics of the audio signal do not match audio characteristics of speech included in the speaker recognition model, the system denies the user access to the system. Otherwise, the user is granted access to the system.

In some implementations, the system uses the audio signal to train the speaker recognition model for the user after the user is granted access to the system (818). This may allow new users to set up accounts with the system and access the accounts without subjecting the user to a time consuming process of providing speech samples to train a speaker recognition model. During an initial period of accessing the system, the system may use solely speech recognition to determine whether the prompts corresponding to the characters of the access code were spoken by the user.

The system may use the audio signals collected during this initial period to train the speaker recognition model for the user. After this initial period, the system may use the speaker recognition models to increase the security of the system.

In some implementations, the system adapts the speaker recognition model based on conditions associated with the user. For example, the system may adapt the speaker recognition model based on acoustic characteristics of the surrounding space, such as the size of the room, noise sources, and reverberation characteristics. As another example, the system may adapt the speaker recognition model based on the user's device characteristics, such as audio characteristics of the user's microphone or audio processing system. In some implementations, multiple speaker recognition models may be associated with the user. For example, the user may be associated with a speaker recognition model that is adapted for audio signals received via a microphone connected to the client device, and associated with another speaker recognition model that is adapted for audio signals received via a telephone connection.

Figure 9:
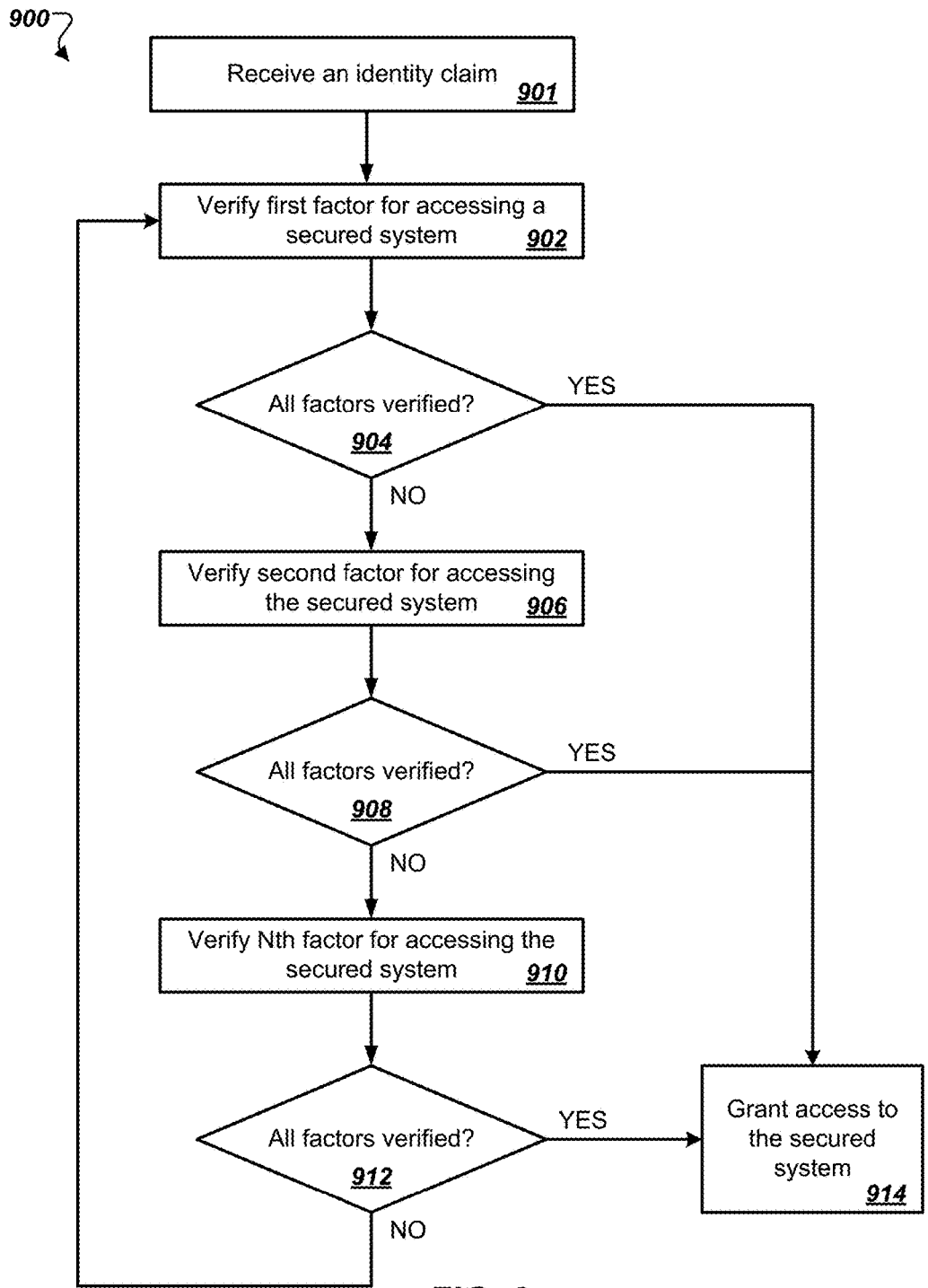

FIG. 9 is a flowchart of an example of a process 900 for controlling access to a secured system. The process 900 may be performed by a secured system, such as client device 102 or server 104 of FIG. 1, or a combination thereof.

The system receives an identity claim 901). The identity claim may be an identifier such as a username, an e-mail address, or an account number. The identity claim may be provided to the system by a user by, for example, entering the claim using a keyboard, speaking the claim into a microphone, or inserting a card that is read by the system.

The system receives and verifies a first factor for accessing a secured system (902). The first factor may be, for example, a password that is entered by the user using an alphanumeric keyboard. The system determines whether all factors required for accessing the secured system has been verified (904). If all factors have been verified, the user is granted access to the system (914). Otherwise, the system receives and verifies a second factor for accessing the secured system (906). The second factor may be, for example, a PIN that is entered by the user using speech input. The system determines whether all factors required for accessing the secured system has been verified (908). If all factors have been verified, the user is granted access to the secured system (914). Otherwise, the system continues to receive and verify factors and to determine whether all factors have been verified. For a two factor system, the system returns to receiving and verifying the first factor (902). For an Nth factor system with N greater than 2, the system receives and verifies each of the factors (910) until all factors have been verified (912). Once all factors have been verified, the user is granted access to the system (914).

For example, in a system that requires two factors, e.g., a typed password and a spoken PIN, for accessing the system, the system receives and verifies the typed password (902). The system determines that the user did not enter the typed password correctly and thus not all factors have been verified (904). The system proceeds to receive and verify the spoken PIN (908). The system determines that not all factors have been verified because the typed password was not verified (908). The system returns to receiving and verifying the typed password (902). The system determines that the user entered the typed password correctly and determines that the first factor has been verified but not all the factors have been verified (904). The system receives and verifies the spoken PIN (906). The system determines that the spoken PIN is correct and thus all factors have been verified (908). The system then grants access to the secured system (914).

In another example, the two-factor system receives and verifies the typed password (902). The system determines that the user has entered the typed password correctly, but not all factors have been verified (904). The system receives and verifies the spoken PIN (906). The system determines that the user entered the spoken PIN incorrectly and thus not all factors have been verified (908). Although the typed password was verified, the system returns to receiving and verifying the typed password (902). The system determines that the user entered the typed password correctly, but not all factors have been verified (904). The system receives and verifies the spoken PIN (906). The system determines that the user entered the spoken PIN correctly and thus all factors have been verified (908). The system then grants the user access to the system (914).

To access the system, a user is required to provide an entry for each factor until each factor has been correctly entered. In some situations, the user may be spared of having to re-enter all of the factors when one of the factors is entered incorrectly. The system may provide no feedback regarding which factors have been correctly or incorrectly entered to prevent an attacker from knowing which factors were correctly entered. The amount of time given to a user for entering each of the factors may be limited for security against attacks.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 10:
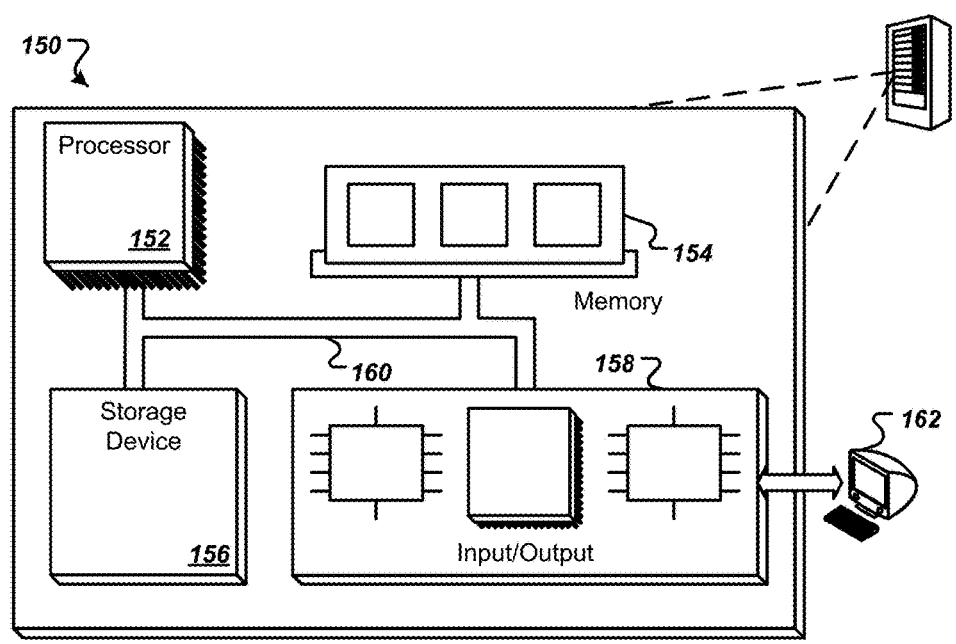
FIG. 10 shows a block diagram of a programmable processing system.

An example of one such type of computer is shown in FIG. 10, which shows a block diagram of a programmable processing system (system). The system 150 can be utilized to implement the systems and methods described herein. The architecture of the system 150 can, for example, be used to implement a computer client, a computer server, or some other computer device.

The system 150 includes a processor 152, a memory 154, a storage device 156, and an input/output device 158. Each of the components 152, 154, 156, and 158 can, for example, be interconnected using a system bus 160. The processor 152 is capable of processing instructions for execution within the system 150. In one implementation, the processor 152 is a single-threaded processor. In another implementation, the processor 152 is a multi-threaded processor. The processor 152 is capable of processing instructions stored in the memory 154 or on the storage device 156.

The memory 154 stores information within the system 150. In one implementation, the memory 154 is a computer-readable medium. In one implementation, the memory 154 is a volatile memory unit. In another implementation, the memory 154 is a non-volatile memory unit.

The storage device 156 is capable of providing mass storage for the system 150. In one implementation, the storage device 156 is a computer-readable medium. In various different implementations, the storage device 156 can, for example, include a hard disk device, an optical disk device, or some other large capacity storage device.

The input/output device 158 provides input/output operations for the system 150. In one implementation, the input/output device 158 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 162.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can be implemented in combination in a single implementation. Conversely, various features that are described in the context of a single implementation can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for accessing a secured system, the method comprising:
   receiving an identifier of a user, wherein the user is associated with an access code for the secured system;
   causing a display to present to the user associated with the access code a first graphical user interface including a plurality of indications, each of the plurality of indications corresponding to a respective character of the access code and a respective location within the first graphical user interface in which the indication is presented, wherein the location for each of the multiple indications directs the user associated with the access code to read a prompt that will be presented in the same location within a second graphical user interface indicating a correspondence between the prompt and the respective character of the access code;
   obtaining a plurality of prompts using the identifier, wherein the plurality of prompts include a first prompt, a second prompt, a third prompt, and a fourth prompt, the first prompt corresponds to a first character of the access code, the second prompt corresponds to a second character of the access code, the third prompt not corresponding to the first character of the access code, and the fourth prompt not corresponding to the second character of the access code;
   after presenting the first graphical user interface including the plurality of indications, causing the display to present a second graphical user interface including the first prompt and the third prompt at a first time in association with the first character of the access code, wherein a location of the first prompt within the second graphical user interface on the display corresponds to a first alternative at the same location as the respective indication presented within the first graphical user interface indicating the correspondence between the first prompt and the first character of the access code, and a location of the third prompt within the second graphical user interface on the display corresponds to a second alternative at a different location from the respective indication presented within the first graphical user interface indicating the lack of correspondence between the third prompt and the first character of the access code;
   causing the display to present the second graphical user interface including the second prompt and the fourth prompt at a second time in association with the second character of the access code, wherein a location of the second prompt within the second graphical user interface on the display corresponds to the first alternative at the same location as the respective indication presented within the first graphical user interface indicating the correspondence between the second prompt and the second character of the access code, and a location of the fourth prompt within the second graphical user interface on the display corresponds to the second alternative at a different location from the respective indication presented within the first graphical user interface indicating the lack of correspondence between the fourth prompt and the second character of the access code;
   receiving an audio signal comprising speech spoken by a user, wherein the audio signal comprises the user speaking the first prompt followed by the second prompt if the user speaking has been directed by the first graphical user interface to speak the first alternatives and is associated with the access code;
   determining whether the audio signal comprises the user speaking the first prompt followed by the second prompt; and
   granting access to the secured system in response to determining that the audio signal comprises the user speaking the first prompt followed by the second prompt; and
   denying access to the secured system in response to determining that the audio signal comprises the user not speaking the first prompt followed by the second prompt, wherein the user speaking the third prompt or the fourth prompt indicates that the user speaking has not been directed by the first graphical user interface to speak the first alternatives and is not associated with the access code.

2. The method of claim 1, wherein the first alternative corresponds to predetermined locations within a graphical user interface that are associated with the identifier.

3. The method of claim 1, wherein the plurality of indications correspond to the first alternatives.

4. The method of claim 3, wherein the plurality of indications further includes audible indications.

5. The method of claim 3, wherein the plurality of indications are presented at locations within the first graphical user interface on the display corresponding to predetermined locations within a graphical user interface that are associated with the identifier.

6. The method of claim 3, further comprising: causing the plurality of indications to be presented at a location within the first graphical user interface on the display that differs from a location corresponding to an immediately preceding presentation of the plurality of indications.

7. The method of claim 3,
wherein the plurality of indications are presented at locations within the first graphical user interface on the display corresponding to the first alternative.

8. The method of claim 3, wherein the plurality of indications are presented at a locations within the first graphical user interface on the display that differs from the first alternative.

9. A non-transitory computer storage medium encoded with instructions that when executed by a data processing device cause the data processing device to perform operations comprising:
receiving an identifier of a user, wherein the user is associated with an access code for a secured system;
causing a display to present to the user associated with the access code a first graphical user interface including a plurality of indications, each of the plurality of indications corresponding to a respective character of the access code and a respective location within the first graphical user interface in which the indication is presented, wherein the location for each of the multiple indications directs the user associated with the access code to read a prompt that will be presented in the same location within a second graphical user interface indicating a correspondence between the prompt and the respective character of the access code;
obtaining a plurality of prompts using the identifier, wherein a first prompt corresponds to a first character of the access code, a second prompt corresponds to a second character of the access code, a third prompt not corresponding to the first character of the access code, and a fourth prompt not corresponding to the second character of the access code;
after presenting the first graphical user interface including the plurality of indications, causing the display to present a second graphical user interface including the first prompt and a third prompt at a first time in association with the first character of the access code, wherein a location of the first prompt within the second graphical user interface on the display corresponds to a first alternative at the same location as the respective indication presented within the first graphical user interface indicating the correspondence between the first prompt and the first character of the access code, and a location of the third prompt within the second graphical user interface on the display corresponds to a second alternative at a different location from the respective indication presented within the first graphical user interface indicating the lack of correspondence between the third prompt and the first character of the access code;
causing the display to present the second graphical user interface including the second prompt and a fourth prompt at a second time in association with the second character of the access code, wherein a location of the second prompt within the second graphical user interface on the display corresponds to the first alternative at the same location as the respective indication presented within the first graphical user interface indicating the correspondence between the second prompt and the second character of the access code, and a location of the fourth prompt within the second graphical user interface on the display corresponds to the second alternative at a different location from the respective indication presented within the first graphical user interface indicating the lack of correspondence between the fourth prompt and the second character of the access code;
receiving an audio signal comprising speech spoken by a user, wherein the audio signal comprises the user speaking the first prompt followed by the second prompt if the user speaking has been directed by the first graphical user interface to speak the first alternatives and is associated with the access code;
determining whether the audio signal comprises the user speaking the first prompt followed by the second prompt; and
granting access to the secured system in response determining that the audio signal comprises the user speaking the first prompt followed by the second prompt; and
denying access to the secured system in response to determining that the audio signal comprises the user not speaking the first prompt followed by the second prompt, wherein the user speaking the third prompt or the fourth prompt indicates that the user speaking has not been directed by the first graphical user interface to speak the first alternatives and is not associated with the access code.

10. The non-transitory computer storage medium of claim 9, wherein:
a first set of one or more other prompts of the plurality of prompts correspond to one or more characters other than the first character,
a second set of the one or more other prompts correspond to one or more characters other than the second character, and
the operations further comprise:
causing the display to present the second graphical user interface including the first set of the one or more other prompts at the first time; and
causing the display to present the second graphical user interface including the second set of the one or more other prompts to be presented on the display at the second time.

11. The non-transitory computer storage medium of claim 9, wherein:
causing the display to present the second graphical user interface including the first prompt and the third prompt comprises presenting for a time period after the first time;
causing the display to present the second graphical user interface including the second prompt and the fourth prompt comprises presenting at the second time after the time period has elapsed; and
causing the display to present the second graphical user interface including the second prompt and the fourth prompt comprises presenting for a time period after the second time.

12. The non-transitory computer storage medium of claim 11, wherein the time period is predetermined based on previous interactions associated with the identifier.

13. The non-transitory computer storage medium of claim 11, wherein the time period is a decrease of a time period associated with the identifier.

14. The non-transitory computer storage medium of claim 11, wherein receiving the audio signal comprising speech spoken by the user comprises:
receiving a first audio signal comprising speech spoken by the user after causing the display to present the second graphical user interface including the first prompt and the third prompt and before causing the display to present the second graphical user interface including the second prompt and the fourth prompt; and
receiving a second audio signal comprising speech spoken by the user after causing the display to present the second graphical user interface including the second prompt and the fourth prompt.

15. A system, comprising:
a data processing apparatus; and
a non-transitory computer storage medium encoded with instructions that when executed by the data processing apparatus cause the data processing apparatus to perform operations comprising
receiving an identifier of a user, wherein the user is associated with an access code for a secured system;
causing a display to present to the user associated with the access code a first graphical user interface including a plurality of indications, each of the plurality of indications corresponding to a respective character of the access code and a respective location within the first graphical user interface in which the indication is presented, wherein the location for each of the multiple indications directs the user associated with the access code to read a prompt that will be presented in the same location within a second graphical user interface indicating a correspondence between the prompt and the respective character of the access code;
obtaining a plurality of prompts using the identifier, wherein a first prompt corresponds to a first character of the access code, a second prompt corresponds to a second character of the access code, a third prompt not corresponding to the first character of the access code, and a fourth prompt not corresponding to the second character of the access code;
after presenting the first graphical user interface including the plurality of indications, causing the display to present a second graphical user interface including the first prompt and a third prompt to be presented on a display at a first time in association with the first character of the access code, wherein a location of the first prompt within the second graphical user interface on the display corresponds to a first alternative at the same location as the respective indication presented within the first graphical user interface indicating the correspondence between the first prompt and the first character of the access code, and a location of the third prompt within the second graphical user interface on the display corresponds to a second alternative at a different location from the respective indication presented within the first graphical user interface indicating the lack of correspondence between the third prompt and the first character of the access code;
causing the display to present the second graphical user interface including the second prompt and a fourth prompt to be presented on the display at a second time in association with the second character of the access code, wherein a location of the second prompt within the second graphical user interface on the display corresponds to the first alternative at the same location as the respective indication presented within the first graphical user interface indicating the correspondence between the second prompt and the second character of the access code, and a location of the fourth prompt within the second graphical user interface on the display corresponds to the second alternative at a different location from the respective indication presented within the first graphical user interface indicating the lack of correspondence between the fourth prompt and the second character of the access code;
receiving an audio signal comprising speech spoken by a user, wherein the audio signal comprises the user speaking the first prompt followed by the second prompt if the user speaking has been directed by the first graphical user interface to speak the first alternatives and is associated with the access code;
determining whether the audio signal comprises the user speaking the first prompt followed by the second prompt; and
granting access to the secured system in response to a result of the determining that the audio signal comprises the user speaking the first prompt followed by the second prompt; and
denying access to the secured system in response to determining that the audio signal comprises the user not speaking the first prompt followed by the second prompt, wherein the user speaking the third prompt or the fourth prompt indicates that the user speaking has not been directed by the first graphical user interface to speak the first alternatives and is not associated with the access code.

* * * * *